United States Patent [19]

Imaizumi

[11] Patent Number: 4,692,670

[45] Date of Patent: Sep. 8, 1987

[54] VERTICAL DEFLECTION CIRCUIT

[75] Inventor: Norio Imaizumi, Gunma, Japan

[73] Assignee: Sanyo Electric Co., Osaka, Japan

[21] Appl. No.: 794,830

[22] Filed: Nov. 4, 1985

[30] Foreign Application Priority Data

Nov. 13, 1984 [JP] Japan .................................. 59-239107

[51] Int. Cl.$^4$ ............................................. H01J 29/70
[52] U.S. Cl. .................................... 315/388; 315/387;
315/408
[58] Field of Search ......................... 315/388, 387, 403

[56] References Cited

U.S. PATENT DOCUMENTS 4,176,300  11/1979  Waeher ............................... 315/388
4,414,494  11/1983  Schmidt .............................. 315/387

FOREIGN PATENT DOCUMENTS 5132934 of 0000  Japan .
56145165 of 0000  Japan .

Primary Examiner—Theodore M. Blum
Assistant Examiner—David Cain
Attorney, Agent, or Firm—Armstrong, Nikaido, Marmelstein & Kubovcik

[57] ABSTRACT

A vertical deflection circuit for a CRT tube, with a so-called Mirror integration circuit, has an integration arrangement with a resistor and a capacitor, and a first amplifier for amplifying saw-tooth wave by the integration arrangement with a deflection coil coupled with output of the amplifier. A first feedback path is located between the deflection coil and the capacitor has been improved by a second feedback path between the deflection coil and input of the first amplifier. The second feedback path provides the sum of the parabolic voltage at the end of the deflection coil which is grounded through a second capacitor and a second resistor, and the saw-tooth wave voltage responsive to the current in the deflection coil to the first amplifier. The second feedback path provides the so-called S-shaped compensation on a screen so that a picture distortion, due to a non-arc face of a screen at peripheral portions, is compensated.

6 Claims, 9 Drawing Figures

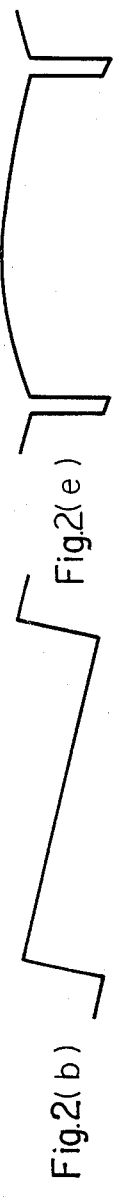
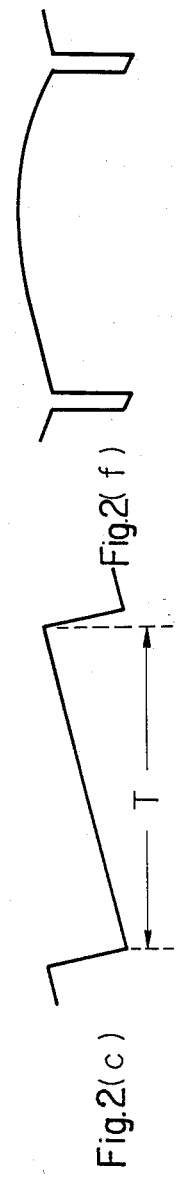

VERTICAL DEFLECTION CIRCUIT

BACKGROUND OF THE INVENTION

The present invention relates to a vertical deflection circuit which is used for a braun tube or a cathode-ray tube (CRT) for a television receiver, a computer terminal apparatus, and/or an office automation apparatus.

A cathode-ray tube for a display screen must have a horizontal deflection circuit and a vertical deflection circuit for scanning a screen by electron beam. Among them, the present invention relates to a vertical deflection circuit with improved linearity.

FIG. 3 shows a circuit diagram of a prior vertical deflection circuit. In the figure, the numeral 1 is a vertical oscillation stage, 2 is an amplifier, 3 is a vertical deflection coil which is mounted on a neck of a CRT (not shown), 4 is a capacitor for preventing DC (direct current) current, 5 is a feedback resistor, 6 is a variable resistor, 7 is a fixed resistor, 8 is a feedback capacitor, 9 is a resistor which functions to charge the feedback capacitor with constant current.

In FIG. 3, a feedback circuit is provided so that the potential at the point A, which is one of the inputs of the amplifier 2, is the same potential as that at point B, which is the other input of the amplifier 2. Accordingly, the current I in the resistor 9 is shown by the following equation.

$$I = (V_{cc} - E_1)/R \quad (1)$$

In the above equation, $V_{cc}$ is the voltage at the DC power source terminal 12, $E_1$ is the voltage of the DC power source 11, R is the resistance of the resistor 9. The current I is supposed to be constant current.

The capacitor 8 is charged by the constant current I through the resistor 9 during a scanning period (when the oscillation output transistor 10 is in an OFF state). Therefore, the voltage v at one end A of the resistor 9 is shown by the following equation.

$$v = I \times t \quad (0 \leq t \leq T)$$

where T is the scanning period of vertical deflection, and t is the time. It should be noted that the waveform of the voltage v is a saw-tooth wave.

The saw-tooth wave voltage v is amplified by the amplifier 2, which applies the linear deflection current to the vertical deflection coil 3. Although a current amplifier is provided between the output of the amplifier 2 and the deflection coil 3, the current amplifier is not shown in the drawing for the sake of simplicity, as it is of no concern to the present invention.

However, a deflection circuit of FIG. 3 has the disadvantage as explained below.

It should be appreciated that a screen of a CRT display tube is generally curved, but the curve is not an exact arc of a circle. Generally, the curved screen is flat at the upper portion and the lower portion when compared with a complete arc screen. Therefore, the deflection length of an electron beam is larger at the upper portion and the lower portion when compared with the deflection length at the central portion of the screen. This causes the distortion of a displayed picture. Accordingly, when a circle is displayed, it is deformed when it is positioned at the peripheral portion of the screen, although it is displayed accurately if it is displayed at the centeral portion of the screen. In FIG. 4, the circle at the center of the screen is displayed accurately, however, the four circles at the peripheral portions of the screen are deformed, and the vertical length is elongated as compared with the horizontal length.

In order to solve the above problem, some improvements have been proposed. The Japanese patent publication No. 32934/76 which claims the convention priority of GB No. 11212/69 dated Mar. 3, 1969, and Japanese laid open patent publication No. 145165/81 are some of them. In those prior arts, a saw-tooth wave is modified by an integration circuit provided between the junction point of the deflection coil 3 and the capacitor 4, and the point A. The integration circuit provides an S-shaped compensation to the saw-tooth wave so that the amplitude of the saw-tooth wave at the beginning point and the end point in each vertical scanning period is a little decreased.

Although the prior S-shaped compensation can get rid of distortion at the peripheral portions of the screen, it has still the disadvantages as explained below.

Firstly, the upper portion of the screen can not be compensated independently from the lower portion of the screen. This means that the amplitude at the beginning of a saw-tooth wave can not be independently adjusted from the amplitude at the end of the saw-tooth wave, by an integration circuit. Therefore, if a screen is not exactly symmetrical electrically by some manufacturing error, the distortion is not compensated at all.

Secondly, the time constant of an integration circuit must be designed for each specific deflection circuit. However, the vertical deflection frequency distributes at least between 40 Hz and 80 Hz. For instance, the NTSC system uses 60 Hz, the PAL system 50 Hz, and a computer display system uses 80 Hz. A prior S-shaped compensation system using an integration circuit can not be used for those variety of deflection frequencies.

SUMMARY OF THE INVENTION

It is an object, therefore, of the present invention to overcome the disadvantages and limitations of a prior vertical deflection circuit by providing a new and improved vertical deflection circuit.

It is also an object of the present invention to provide a vertical deflection circuit which can compensate the deform on a screen for all types of CRT tubes, and all the vertical deflection frequencies.

The above and other objects are attained by a vertical deflection circuit for providing saw-tooth wave deflection current in a vertical deflection coil for a CRT tube comprising; a first amplifier with an input terminal coupled with an output of a vertical oscillation circuit, a first register coupled between the input terminal of the first amplifier and a power source, a first capacitor one end of which is coupled with the input terminal of the first amplifier, an output of the first amplifier being coupled with one end of the deflection coil the other end of which is grounded through a second capacitor and a second register, the other end of the first capacitor being coupled with a junction point of the second capacitor and the second resistor, to provide a first feedback path, wherein a second feedback path is provided so that sum voltage of a parabolic voltage at junction point of the deflection coil and the second capacitor, and saw-tooth wave voltage at junction point of the second capacitor and the second resistor, is applied to the input terminal of the first amplifier.

BRIEF DESCRIPTION OF THE DRAWINGS

The foregoing and other objects, features, and attendant advantages of the present invention will be appreciated as the same become better understood by means of the following description and accompanying drawings wherein;

FIGS. 2(a)-2(f) show the operational waveforms of the circuit of FIG. 1.

DESCRIPTION OF THE PREFERRED EMBODIMENTS

Figure 1:
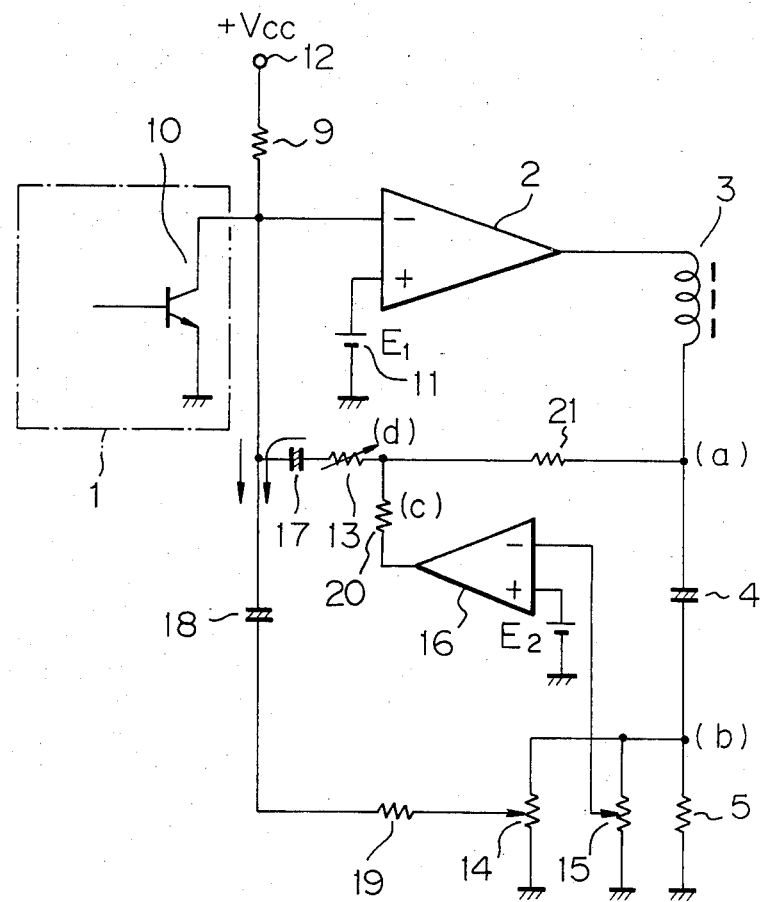
FIG. 1 is a circuit diagram of the vertical deflection circuit according to present invention.

FIG. 1 shows the vertical deflection circuit according to the present invention, and FIG. 2 shows the operational waveforms of the circuit of FIG. 1.

Figure 3:
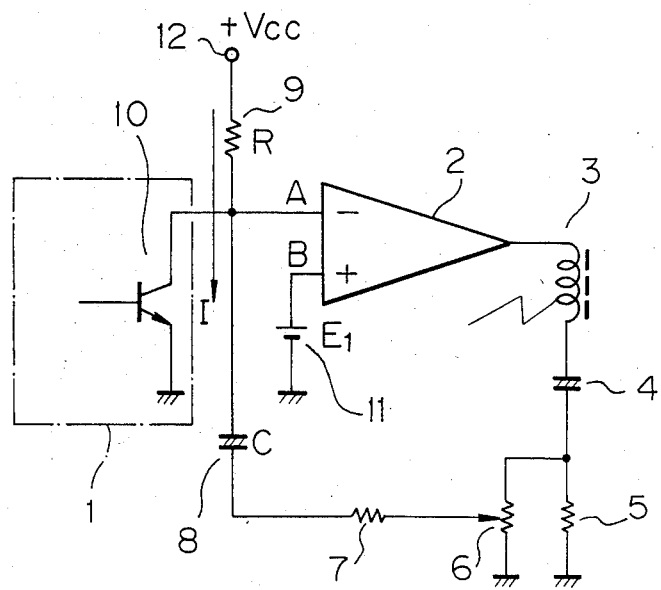
FIG. 3 is a circuit diagram of a prior vertical deflection circuit.
Figure 4:
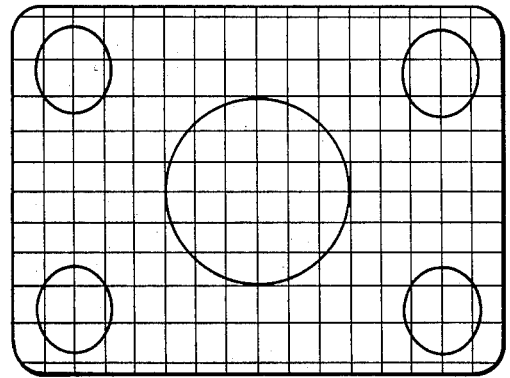
FIG. 4 shows a pattern indicated on a screen by the circuit of FIG. 3.

In FIG. 1, the same members as those in FIG. 3 have the same reference numerals as those in FIG. 3. In FIG. 1, the numeral 1 is a vertical oscillation stage, 2 is an amplifier, 3 is a vertical deflection coil, 9 and 18 are first resistor and first capacitor, respectively, for integration, 4 and 5 are second capacitor and second resistor, respectively, 17 is a third capacitor, 13 is a first variable resistor, 14 is a second variable resistor, 15 is a third variable resistor, 16 is an inverter-amplifier, and 19, 20 and 21 are resistors. When the amplifier 16 is embodied by an operational amplifier, the second input of the same receives the fixed potential $E_2$.

In FIG. 1, the oscillation output signal provided by the vertical oscillator 1 is applied to the vertical deflection coil 3, the capacitor 4 and the resistor 5, through the amplifier 2, so that a saw-tooth wave current flows in the series circuit of the coil 3, the capacitor 4 and the resistor 5. The saw-tooth wave current is shown in FIG. 2(b), and that waveform is observed at the junction point (b) between the capacitor 4 and the resistor 5. A part of the saw-tooth wave voltage is taken by the variable resistor 15, and the output of the same is applied to the amplifier 16, which provides the output as shown in FIG. 2(c).

On the other hand, a parabolic voltage as shown in FIG. 2(a) appears at the junction point (a) of the deflection coil 3 and the capacitor 4. The sum of the parabolic voltage and the output of the amplifier 16 is taken by the resistors 20 and 21, and the first variable resistor 13. That sum is applied to the input of the amplifier 2 through the capacitor 17. Therefore, the voltage at the point (d), which is the sum of the parabolic voltage from the point (a), and the saw-tooth wave voltage from the point (c) is shown in FIG. 2(d), in which the level between the pulses is not linear but curved. Thus, the saw-tooth wave voltage from the variable resistor 14 and the parabolic voltage from the variable resistor 13 are fed-back to the input terminal of the amplifier 2, and therefore, the S-shaped compensation is accomplished.

The presence of the second feedback path by the resistors 13 and 21 and the capacitor 17 together with the amplifier 16 is the feature of the present invention.

The amount of the S-shaped compensation is adjusted by the variable resistor 13.

Further, the third variable resistor 15 adjusts the component of the saw-tooth wave voltage in the sum voltage at the point (d). When the component of the saw-tooth wave voltage is large as compared with the parabolic voltage, the rear portion of the point (d) is raised as shown in FIG. 2(f). On the other hand, when the component of the saw-tooth wave voltage is small as compared with the parabolic voltage, the front portion of the point (d) is raised in each vertical scanning period as shown in FIG. 2(e). Therefore, the adjustment of the third variable resistor 15 allows the adjustment of the upper portion and/or the lower portion of a screen to be independently compensated for.

As mentioned above, according to the present invention the S-shaped compensation is accomplished by modifying the input signal of the amplifier 2 by the parabolic voltage and the saw-tooth wave voltage. The amount of the compensation, and/or characteristics of the compensation may be adjusted by adjusting the ratio of the parabolic voltage and the saw-tooth wave voltage. As no integrator is used in the present invention, the present circuit can be used in any vertical deflection circuit with arbitrary vertical deflection frequency.

From the foregoing it will now be apparent that a new and improved vertical deflection circuit has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A vertical deflection circuit for providing saw-tooth wave deflection current in a vertical deflection coil for a CRT tube comprising:

a first amplifier with an input terminal coupled with an output of a vertical oscillation circuit;

a first resistor coupled between said input terminal of the first amplifier and a power source;

a first capacitor one end of which is coupled with said input terminal of the first amplifier;

an output of said first amplifier being coupled with one end of the deflection coil, the other end of said deflection coil is grounded through a second capacitor and a second resistor, the other end of said first capacitor being coupled with a first junction point of said second capacitor and said second resistor, to provide a first feedback path; and a second feedback path is provided so that a sum voltage of a parabolic voltage at a second junction point of said deflection coil and said second capacitor, and saw-tooth wave voltage at the first junction point of said second capacitor and said second resistor, is applied to said input terminal of the first amplifier, said second feedback path comprises a second amplifier with an input terminal coupled with the first junction point of said second capacitor and said second resistor, a resistor network for providing sum of voltages at the second junction point of the deflection coil and the second capacitor, and output of the second amplifier and a third capacitor are coupled between said resistor network and the input terminal of the first amplifier.

2. A vertical deflection circuit according to claim 1, wherein a first variable resistor is provided between the first capacitor and the junction point of first second capacitor and the second resistor.

3. A vertical deflection circuit according to claim 1, wherein a second variable resistor is provided between the input of the second amplifier and the first junction point of the second capacitor and the second resistor.

4. A vertical deflection circuit according to claim 1, wherein a third variable resistor is provided between said resistor network for sum of voltages and said third capacitor.

5. A vertical deflection circuit for providing saw-tooth wave deflection current in a vertical deflection coil for a CRT tube comprising:
- a first amplifier with first and second input terminals, said first input terminal coupled with an output of a vertical oscillation circuit;
- a first resistor coupled between said first input terminal of said first amplifier and a power source;
- a first capacitor having one end coupled with said first input terminal of the first amplifier;
- an output of said first amplifier being coupled with one end of the deflection coil, the other end of said deflection coil is grounded through a second capacitor and a second resistor,
- the other end of said first capacitor being coupled with a first junction point of said second capacitor and said second resistor to provide a first feedback path to said first input terminal of the first amplifier; and
- a second feedback path is provided to said first input terminal of the first amplifier so that a sum voltage of the parabolic voltage at a second junction point of said deflection coil and said second capacitor, and a saw-tooth wave voltage at the first junction point of said second capacitor and said second resistor, is applied to said first input terminal of the first amplifier.

6. A vertical deflection circuit according to claim 5, wherein said second feedback said feedback path comprises a second amplifier with an input terminal coupled with the first junction point of said second capacitor and said second resistor, a resistor network for providing sum of voltages at the second junction point of the deflection coil and the second capacitor, and output of the second amplifier and a third capacitor are coupled between said resistor network and the first input terminal of the first amplifier.

* * * * *